June 28, 1960
L. C. THAYER ET AL
2,943,028
METHOD OF OXYGEN ANALYSIS
Filed Oct. 14, 1958
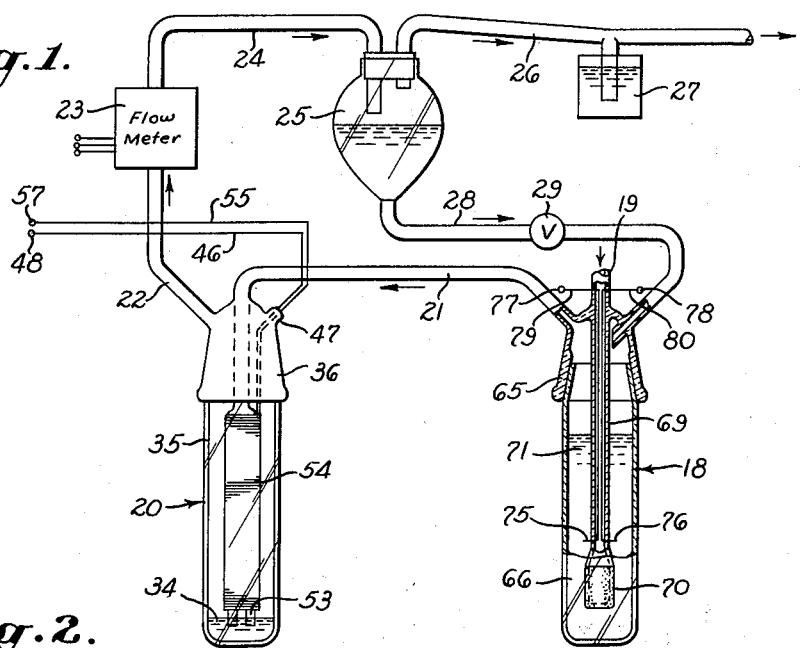
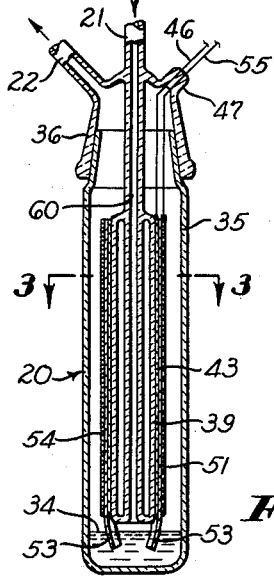
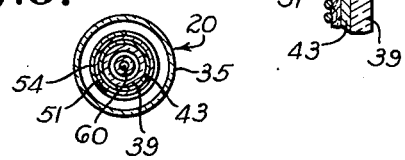
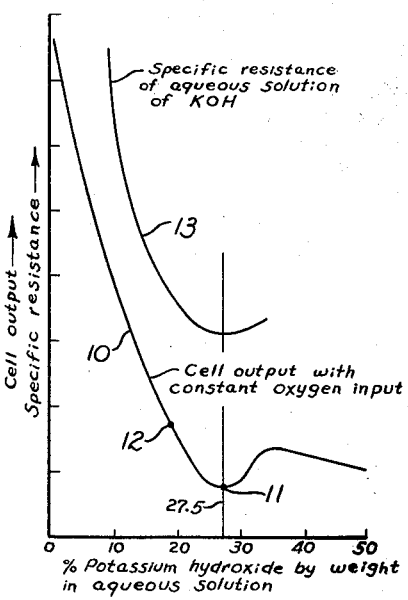
INVENTORS.
LOUIS C. THAYER
MICHAEL CZUHA, JR.
BY THEIR ATTORNEYS.
HARRIS, KIECH, FOSTER & HARRIS United States Patent Office 2,943,028
Patented June 28, 1960

2,943,028

METHOD OF OXYGEN ANALYSIS

Louis C. Thayer, San Jose, and Michael Czuha, Jr., Temple City, Calif., assignors to Beckman Instruments, Inc., a corporation of California Filed Oct. 14, 1958, Ser. No. 769,969

1 Claim. (Cl. 204—1)

This invention relates to novel methods and apparatus for determining the amount of oxygen in a gas and in particular, to methods and apparatus suitable for use when very small quantities of oxygen are present in the gas.

This application is a continuation-in-part of our co-pending application entitled "Method and Apparatus for Oxygen Analysis," Serial No. 658,724, now abandoned, filed May 13, 1957.

The invention utilizes the well known principle of the galvanic cell comprising two electrodes coupled by an electrolyte with at least one of the electrodes, the cathode, positioned so that it may also be contacted by the gas being analyzed. In the absence of oxygen, no reaction occurs in the cell, the cathode not being reactable with the electrolyte at any time and the anode being reactable with the electrolyte only when the electrolyte is reacting with oxygen at the cathode. However, in the presence of oxygen, an electrochemical reaction occurs at the cathode and the oxygen is reduced. In this process, the anode is partially dissolved and an electrical current is produced in an external circuit connecting the cathode and anode, the magnitude of the current being a function of the quantity of oxygen present in the incoming gas.

Previously known methods and apparatus utilizing the above-described principle have not been satisfactory for continuous, long term use in oxygen analysis because the instruments have been nonlinear and unstable, requiring repeated calibration and expensive maintenance.

Accordingly, it is an object of the invention to provide a method for determining the oxygen content of a sample gas which is suitable for use in continuous measurements over periods as long as several weeks without requiring calibration. Another object of the invention is to provide such a method which is highly accurate and linear in the range of a few parts per million of oxygen in the sample gas to several hundred parts per million.

It is a further object of the invention to provide a method for analyzing a sample gas for its oxygen content in which the analysis cell is operated at an optimum concentration of the electrolyte. Another object of the invention is to provide a method for analyzing a sample gas for its oxygen content in which the humidity of the incoming sample gas is controlled so that the vapor pressure of water in the incoming sample gas will correspond to the equilibrium water vapor pressure over the electrolyte in the analysis cell, thereby preventing transfer of water between the sample gas and the electrolyte in the cell and hence substantially reducing or eliminating variations in electrolyte concentration.

It is another object of the invention to provide a process for determining the amount of oxygen in a sample gas in which the sample gas is first passed through a liquid container or scrubber cell for adding water vapor to the sample gas before it is passed through the analysis cell. A further object of the invention is to provide such a method in which the exhaust sample gas is passed over the water used in the initial scrubber cell for deaerating the water prior to its transfer to the scrubber cell.

It is also an object of the invention to provide an analysis cell comprising successive layers of an anode, an absorbent material and a cathode wrapped around a cell form with the absorbent material having tabs extending therefrom and adapted to be immersed in a pool of the electrolyte.

It is a further object of the invention to provide apparatus for carrying out the methods referred to above and described herein. Other objects of the invention will more fully appear in the course of the following description wherein preferred embodiments of the methods and apparatus of the invention are given by way of illustration or example.

In the drawing:

Fig. 1 is a partially diagrammatic view of a preferred embodiment of the invention;

Fig. 2 is an enlarged sectional view of the analysis cell of Fig. 1;

Fig. 3 is a sectional view taken along the line 3—3 of Fig. 2;

Fig. 4 is an enlarged view of a portion of the cell of Fig. 2; and

Fig. 5 is a diagram illustrating certain features of the invention.

The process of the invention will be described herein in conjunction with a particular analysis cell; however, it is realized that the process is equally applicable to cells utilizing different materials and examples of such cells will be given herein. In the galvanic cell, an anode which in this embodiment is of lead, is coupled to a cathode, which is of silver, by an electrolyte, which is an aqueous solution of potassium hydroxide. The electrodes may be coupled by being immersed in the electrolyte or by being separated by a layer of material which is soaked with the electrolyte. A portion of the cathode is exposed to the sample gas and when it contains oxygen, there is an electrochemical reaction at the interface of the cathode and the electrolyte involving the oxygen and also a reaction between the anode and the electrolyte which results in an electrical current in an external circuit coupling the anode and cathode. The reactions occur spontaneously upon closing the circuit externally, the net result being the consumption of oxygen and the dissolution of the lead electrode. The current generated is proportional to the partial pressure of oxygen in the gas surrounding the cathode. In the complete absence of oxygen, no reactions take place within the cell and there is no current produced.

The reactions occurring when oxgen is present are believed to be as follows. The oxygen is absorbed into the electrolyte producing hydroxyl and hydroperoxyl ions. These anions react with the lead anode producing plumbite ions resulting in an electromotive force being developed between the two electrodes. Any conventional current indicating or recording device may be connected to the electrodes to indicate the current generated.

Other suitable materials for the anode are antimony, cadmium, bismuth, copper, and similar metals. Other suitable materials for the cathode are nickel, platinum, gold and similar metals. Othere suitable electrolytes are sodium hydroxide, barium hydroxide, potassium chloride, sulfuric acid and the like. Another preferred combination is gold for the cathode, copper for the anode and an aqueous solution of sulfuric acid for the electrolyte.

It is preferred that this oxygen analysis process be carried out at a substantially constant temperature and at an approximately constant rate of flow and pressure, which may be at atmospheric pressure. If such constant conditions are not maintained, it is necessary to compensate the readings obtained for the variations, since the current output of the cell is a function of the temperature, rate of flow and pressure as well as of the oxygen content.

It has been found that in the operation of such an analysis cell, the linearity and long term stability of the oxygen content measurements may be substantially improved by utilizing an electrolyte of a particular concentration. The output of a cell with constant oxygen input varies with the concentration of the electrolyte, such as shown by the curve 10 on the graph of Fig. 5 for a cell using an aqueous solution of potassium hydroxide as an electrolyte. In the vicinity of the zero slope point 11 on the curve 10, the output of the cell is substantially constant with small changes in concentration of the electrolyte, whereas, at other points, such as the point 12, the output of the cell varies substantially with small changes in concentration. It has been found that the concentration of the electrolyte corresponding to the zero slope point 11 is also the concentration of the electrolyte having the minimum specific resistance. This is indicated by the curve 13 on the graph of Fig. 5. This point also corresponds to the concentration providing the maximum concentration of ions. For an aqueous solution of potassium hydroxide, the optimum point calls for 27.5 percent potassium hydroxide by weight, corresponding to approximately a 6.2 normal solution. In general, a cell will desirably be operated with the concentration of the electrolyte varying not more than ten percent from the concentration thereof at a minimum specific resistance, i.e., between 24.8 and 30.2 percent potassium hydroxide for an aqueous solution thereof. Similarly, for an electrolyte of an aqueous solution of sulfuric acid, the optimum point calls for 30 percent sulfuric acid by weight, which also is the concentration having minimum specific resistance.

It has also been found that the linearity and long term stability of the oxygen analysis process may be substantially improved by the operation of the analysis cell with a constant concentration for the electrolyte, preferably, of course, the optimum concentration described above. This is achieved by controlling the vapor pressure of the sample gas entering the analysis cell so that there is no transfer of liquid between the electrolyte in the analysis cell and the sample gas, thereby maintaining concentration of the electrolyte constant. In the specific example discussed above, the incoming sample gas is first passed through a container having water therein and is then passed through the analysis cell. The relative sizes of the first container and the analysis cell, the amount of water in the first container and the rate of flow of the gas through the container and cell are adjusted so that the vapor pressure of water in the sample gas leaving the first container will correspond to the equilibrium water vapor pressure over the electrolyte in the analysis cell. Under these conditions, water will neither be added to nor subtracted from the electrolyte in the cell by the sample gas passing therethrough.

In carrying out the sample gas humidifying process described above, it is preferred to use a somewhat diluted solution of the electrolyte in the first container and to bubble the sample gas therethrough. This provides a simple control for the amount of water vapor taken up by the sample gas by merely adjusting the concentration of this dilute solution of the electrolyte relative to the stronger solution of the electrolyte contained in the analysis cell. The sample gas on passing through the diluted electrolyte approaches saturation at the dilute solution temperature. The degree of approach depends upon flow rate, amount of dispersion in bubbling and cell geometry as well as on the lowering of the water vapor pressure by the dissolved material in the solution.

As water is taken from the solution by the sample gas passing therethrough, the vapor pressure in the humidifier drops resulting in a lower water vapor pressure in the sample gas as it leaves the humidifying cell and passes to the analysis cell. Under these conditions, some water is lost from the electrolyte in the analysis cell to the sample gas producing a small change in concentration of the electrolyte. However, if the electrolyte concentration is initially within the preferred conditions described above, such as at the point 11 of Fig. 5, such changes in concentration will not affect the accuracy of the measurements.

Since the amount of water vapor taken up by the sample gas passing through the first container is a function of the concentration of the solution in the first container, it is desirable to maintain this concentration substantially constant. This is accomplished by occasionally, such as daily, adding makeup water to the solution in the container to bring it up to a predetermined level. Then the water vapor pressure of the sample gas goes up and the water lost to the sample gas by the electrolyte of the analysis cell is restored. If closer control of the analysis cell electrolyte is desired, the liquid level in the humidifier cell can be checked more often.

Such makeup water should be pure, free of ions and oxygen. A novel process for deaerating and, of course, thereby deoxygenating the makeup water is incorporated in the invention. The makeup water is stored in an enclosed container and the sample gas leaving the analysis cell is flowed through this container thereby deaerating the makeup water stored therein. At regular intervals or as needed, the deaerated makeup water is transferred to the humidifying container.

The passing of the sample gas through a solution of the electrolyte in the first container also removes undesirable gases from the sample gas, another important advantage of the use of a diluted solution of the electrolyte. These gases, such as carbon dioxide, hydrogen sulfide, acetylene, hydrogen cyanide, sulphur dioxide, nitrogen dioxide and the like, react with the electrolyte and, if present in the analysis cell, such reaction would mask the reaction due to the presence of oxygen. However, when the sample gas is first passed through the same electrolyte in the humidifying container, all of these undesirable gases are removed.

Another method of controlling the water vapor pressure of the sample gas is to use a saturated solution of a salt in the humidifier cell, the particular salt used being one whose saturated solution at the operating temperature has the desired vapor pressure. Then as water is lost to the sample gas from the saturated solution, the salt drops out of solution and the vapor pressure remains constant. The addition of makeup water does not change the vapor pressure either.

Another feature contributing to the accuracy and stability of the process of the invention is the maintenance of an adequate quantity of electrolyte between the electrodes of the cell. When the electrolyte coupling the electrodes becomes depleted, as is the case with equipment in which the electrolyte is contained in a carrier positioned between the electrodes requiring the carrier to be periodically replenished, the sensitivity of the instrument fluctuates and the accuracy is therefore adversely affected.

The process of the invention described herein will continuously and accurately measure the oxygen content of a sample gas, giving highly accurate results for weeks of operation with an output that is linear in the range of a few parts per million to several hundred parts per million of oxygen. When the initial conditions of temperature, rate of flow and pressure are maintained, it is not necessary to calibrate the instrument during this period. The reaction occurring at the anode produces ions generated by the dissolution of the anode as described above. The accumulation of these ions in the electrolyte reduces the sensitivity of the process and for this reason, the electrolyte in the cell is occasionally replaced. However, such replacement is infrequent, being required only once every few months, typically once every month of continuous operation.

The process of the invention will be further described in conjunction with the following description of the preferred form of an apparatus for carrying out the process. In Fig. 1, the sample gas which is to be analyzed is fed into a humidifier and scrubber 18 through an inlet pipe 19 and then out of the scrubber 18 to an analysis cell 20 via a pipe 21. The gas leaving the analysis cell 20 passes through a pipe 22, a flow meter 23, another pipe 24, a makeup water tank 25 and an exhaust line 26, the latter being supplied with a water trap 27 for removing condensate from the exhaust sample gas. The makeup water tank 25 is positioned above the container 18 for gravity feed of water thereto through a pipe 28 having a flow control valve 29 therein.

In the analysis cell 20, a pool 34 of electrolyte is held in the bottom of a hollow cylindrical container 35 of glass or the like, the container 35 having a cap 36 closing the top thereof and connecting with the pipes 21 and 22. The cap 36 includes a cylindrical cell form 39 (Fig. 2) extending downward therefrom terminating above the surface of the pool 34, the electrodes of the galvanic cell being mounted on the cell form. The anode is placed thereon first and in the preferred embodiment illustrated herein, the anode comprises a sheet 43 (Fig. 4) of metallic foil wrapped around the cell form. One end of an electrical conductor 46 (preferably of the same metal as the anode) is connected to the sheet 43, the conductor 46 passing through a seal 47 in the cap 36 and terminating at a terminal 48. A layer of absorbent material 51, such as filter paper, is wrapped around the metallic foil on the cell form, a plurality of tabs 53 being provided on the layer of absorbent material for reaching into the pool 34. The layer of absorbent material is then wrapped with closely spaced turns of wire 54 which extend substantially the full height of the cell form, the upper end of the wire 54 being joined to a conductor 55 which passes through the seal 47 in the cap 36 and terminates at a terminal 57.

The incoming sample gas from the pipe 21 flows downward through an opening 60 in the cell form 39, outward above the pool 34 and then upward between the inner wall of the container 35 and the wire turns, leaving the cell through the pipe 22. A quantity of electrolyte is maintained in the layer of absorbent material 51 between the metallic foil 43 and the wire 54 by capillary action through the tabs 53 in the pool of electrolyte 34. The foil sheet is the anode and the wire is the cathode and when the sample gas containing oxygen flows upward past the wire, the reaction previously described occurs and the current generated in the cell may be measured by any suitable current measuring device connected to the terminals 48, 57 or may be used to actuate a control system for controlling the oxygen content of the sample gas. In its preferred embodiment, the metallic foil of the cell would be lead, the wire would be silver and the electrolyte would be aqueous solution of potassium hydroxide at a concentration of approximately 27.5 percent by weight.

In the construction of the analysis cell described above, it is preferred to make the flow passage between the turns of the cathode and the wall of the container quite small so that the velocity of the sample gas at this point is relatively high resulting in a much higher sensitivity for the instrument.

The humidifier and scrubber 18 includes a cap 65 and a container 66 similar to those used in the analysis cell 20. A tube 69 is mounted in the cap 65 and extends downward therefrom into the container 66, the lower end of the tube being enlarged and enclosed by a porous cap 70. A liquid 71 including water, preferably a dilute solution of the electrolyte used in the analysis cell 20, is placed in the container 66 with a level above the porous cap 70 and two conductors 75, 76 which are sealed in the wall of the tube 69. The conductors 75, 76 are connected to terminals 77, 78 by leads 79, 80 passing upward through the tube 69 and the cap 65. The conductors 75, 76 are used in calibrating the instrument as will be described subsequently, and are preferably made of platinum.

The sample gas flows into the humidifier and scrubber 18 through the inlet pipe 19 and the tube 69, passes through the porous cap 70, is bubbled upward through the liquid 71 and flows outward to the analysis cell through the pipe 21. As the gas passes through the humidifier and scrubber, it takes up water vapor from the liquid 71 and certain gases which may be present in the sample gas react with the liquid as previously described. The size of the humidifier and scrubber, the concentration of the liquid therein and the rate of flow of the sample gas therethrough are adjusted so that the vapor pressure of water in the sample gas leaving the humidifier and scrubber corresponds to the equilibrium water vapor pressure over the electrolyte in the analysis cell. The water removed from the liquid 71 by the sample gas is replaced from the makeup water tank 25 by actuation of the flow control valve 29. In ordinary operation of the instrument, it is necessary to check the liquid level in the humidifier and scrubber approximately once a day and to add sufficient water to raise the level to the desired position.

The instrument may be calibrated by connecting a direct current voltage to the terminals 77, 78. This results in electrolysis of a portion of the liquid 71 producing oxygen which mixes with the sample gas bubbling upward through the liquid past the electrode 75, 76, the amount of oxygen generated by electrolysis being proportional to the current passed by the terminals 77, 78. The change in reading occurring at the terminals 48, 57 occurring as a result of the addition of a known amount of oxygen to the sample gas provides a direct relation between the current generated in the cell and the oxygen content of the sample gas.

As stated previously, the makeup water stored in the tank 25 should be pure and free of ions. This water should also be free of oxygen since any oxygen contained therein would disturb the accuracy of the readings if this oxygen were to be carried out of the humidifier and scrubber by the sample gas. Therefore, it is desirable to deaerate the makeup water prior to introducing it into the scrubber and humidifier and this is accomplished in the preferred embodiment of the invention by passing the exhaust gas from the analysis cell through the tank containing the makeup water.

It is desirable to operate the apparatus of the invention in a substantially constant temperature environment and at an approximately constant pressure and flow rate since otherwise it is necessary to compensate the readings obtained for variations in these conditions. Pressure and flow rate may be controlled by providing a pressure regulator and needle valve in the line leading to the inlet pipe 19 and the temperature may be controlled by enclosing the entire apparatus in a thermostatically controlled box. The flow meter 23 provides a continuous and accurate check on the rate of flow of sample gas through the apparatus.

The apparatus of the invention may be operated in the same manner as other well known analyzing equipment, such as that disclosed in the U.S. patents to Haller, 2,651,612, and Hersch, 2,805,191, and the British Patents 707,323 and 750,254. As a specific example, an analyzer was constructed in accordance with this invention as follows: The anode 43 was one layer of sheet lead, 0.008 inch thick. The electrodes were separated by two layers 51 of filter paper. The cell form 39 was glass tubing approximately 6 inches long and ¾ inch in diameter. Filter paper was wrapped on the glass form (two layers). The lead sheet was wrapped on top of the filter paper, then two more layers of filter paper with tabs extending downward to contact the pool of electrolyte. The filter paper was secured by tightly wrapped turns of silver wire 54. This silver wire was brought out the top of the cell form through a wax seal. The lead anode was formed with a tab to which was soldered another silver lead wire 46. The lead-silver junction was then sealed with wax to prevent exposure to the electrolyte, and the silver lead was taken out the top of the cell form through a wax seal. The lead and silver electrode leads were connected to a 0–500 microampere meter of about 2000 ohms resistance.

The electrolyte employed in the analysis cell 20 was 27.5% KOH by weight.

The efficiency of the scrubber 18, that is, the ratio of the measured water vapor pressure of gas which had been passed through the scrubber to the saturation vapor pressure (from tables) for the operating temperature of 45° C., was found to be 0.80. From tables in handbooks, it was determined that the partial pressure of water vapor above 27.5% KOH is about 46 mm. Hg at 45° C. In order to obtain a partial pressure of 46 mm. Hg water vapor in the gas leaving a scrubber, the efficiency of which is 0.80, the scrubber must be filled with a solution for which saturation vapor pressure is 46/0.80=57.5 mm. Hg. At 45° C., this requirement is met by a 20% KOH solution (by weight). Accordingly, the scrubber was filled with 20% KOH.

The scrubber was constructed from standard commercial glassware. The fritted glass element 70 was "fine"; the reservoir 66 was about six inches long and one inch in diameter. The fritted element was approximately 3½ inches below the surface of the scrubber electrolyte. Two platinum leads 79, 80 were sealed in the glass scrubber tube just above the fritted element, and passed out of the scrubber unit through wax seals at the top. The platinum wires 75, 76 (#28 gauge, about 0.012 inch diameter) protruded from the scrubber tube about ⅜ inch. A D.C. power supply and 0–3 milliampere meter were connected in series to these platinum electrodes, so that oxygen might be generated by electrolytic decomposition of water.

The water reservoir 25 was of glass. The reservoir was connected to the scrubber by flexible tubing 28, with a pinch clamp serving as an on-off valve 29. The gas passed from the galvanic cell 20 through flexible tubing 22, 24 to the top of the water reservoir where it entered through a two hole rubber stopper. The gas was discharged near the surface of the water reservoir, then exited through the second hole in the stopper.

The various units were connected together and found to be leak free as evidenced by the fact that when entrance and exit lines were closed off, the cell output current decreased to zero exponentially with time. Hydrogen gas was passed through a Deoxo unit (a commercially available $O_2$ removal unit) and then through the analyzer. The output current was found to be about 3.5 microamperes, with the $H_2$ flow rate set at 100 ml./min. The D.C. power supply was turned on, and the current through the platinum electrodes was adjusted to 2.0 milliamperes. From Faraday's law and the fact that the gas flow rate was 100 ml.min., this current would add 70 p.p.m. (by volume) oxygen to the hydrogen. The output meter indicated 205 microamperes. With 1.0 milliampere calibrator current flow, an output of about 104 microamperes was observed. Taking into account the cell current of 3.5 microamperes at zero calibrator current, these figures indicate a cell output of about 3 microamperes per p.p.m. $O_2$, and that the cell output was linear.

It was found that the day to day stability of the instrument was about ±5% of reading, compared to ±20% of reading observed when the scrubber was charged with water or 27.5% KOH instead of 20% KOH. It was found that addition of water to the scrubber from the water reservoir had no apparent effect on the cell output 24 hours after gas flow commenced. Shortly after the gas flow commenced, addition of water caused a marked increase in reading (off scale on a 200 p.p.m. range) which decayed exponentially with time. These tests demonstrated the advantages of maintaining low oxygen concentration in the makeup water by passing the low oxygen containing gas over the water.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

A process for analyzing a sample gas for its oxygen content using an aqueous electrolyte, the process including the steps of: passing the sample gas at a substantially constant rate through a relatively dilute solution of the aqueous electrolyte for increasing the vapor pressure of the water in the sample gas to substantially correspond to the equilibrium water vapor pressure over a relatively concentrated solution of the electrolyte which is of a concentration having substantially a minimum value of specific resistance at the particular operating temperature; flowing the sample gas past a cathode of a galvanic cell which is coupled to an anode of the cell by the relatively concentrated solution of the electrolyte, the cathode not being reactable with the electrolyte, the anode being reactable with the electrolyte when the oxygen in the sample gas is reacting with the electrolyte and not being reactable with the electrolyte in the absence of oxygen, the anode being more noble than hydrogen in said electrolyte; flowing the sample gas past an enclosed quantity of makeup water for deaerating the makeup water; replacing that water removed from the relatively dilute solution of the electrolyte by the sample gas with a portion of the deaerated water to maintain concentration of the relatively dilute solution approximtaely constant; and determining the magnitude of the electric current produced between the cathode and anode as a measure of the oxygen content of the sample gas.

References Cited in the file of this patent
UNITED STATES PATENTS

| | | |
|---|---|---|
| 2,508,238 | Fagen | May 16, 1950 |
| 2,585,060 | Wallace | Feb. 12, 1952 |
| 2,758,075 | Swalheim | Aug. 7, 1956 |
| 2,905,191 | Hersch | Sept. 13, 1957 |